United States Patent [19]
Solomon

[11] 3,889,250
[45] June 10, 1975

[54] ACTIVE FREQUENCY-RESPONSIVE GLASS BREAKAGE DETECTOR
[75] Inventor: Elias E. Solomon, Duxbury, Mass.
[73] Assignee: Gulf & Western Manufacturing Company, New York, N.Y.
[22] Filed: Oct. 15, 1973
[21] Appl. No.: 406,490

[52] U.S. Cl. ................ 340/274; 340/261; 340/409
[51] Int. Cl. .......................................... G08b 13/04
[58] Field of Search.... 340/274, 261, 258 D, 258 C, 340/409, 15; 181/.5 AC; 329/111; 73/70; 310/8.1

[56] References Cited
UNITED STATES PATENTS
| | | | |
|---|---|---|---|
| 2,524,579 | 10/1950 | Taylor | 340/261 |
| 3,147,467 | 9/1964 | Laakmann | 340/409 |
| 3,270,339 | 8/1966 | McEulen et al. | 340/258 R |
| 3,750,127 | 7/1973 | Ayers et al. | 340/261 |

*Primary Examiner*—Glen R. Swann, III
*Attorney, Agent, or Firm*—Wolf, Greenfield & Sacks

[57] ABSTRACT

The detector is primarily for detecting glass breakage and is constructed as an active device or system for detecting the breakage and generating an alarm signal. The detector generally comprises a transmitter trandsucer of fixed first frequency below the frequency occasioned by breakage, a receiver transducer for receiving a signal which is a composite of the first frequency signal and the breakage frequency signal when a breakage occurs, a demodulator or mixer for obtaining the difference or sum frequency and alarm means for establishing an alarm condition upon detection of this difference or sum frequency.

18 Claims, 3 Drawing Figures

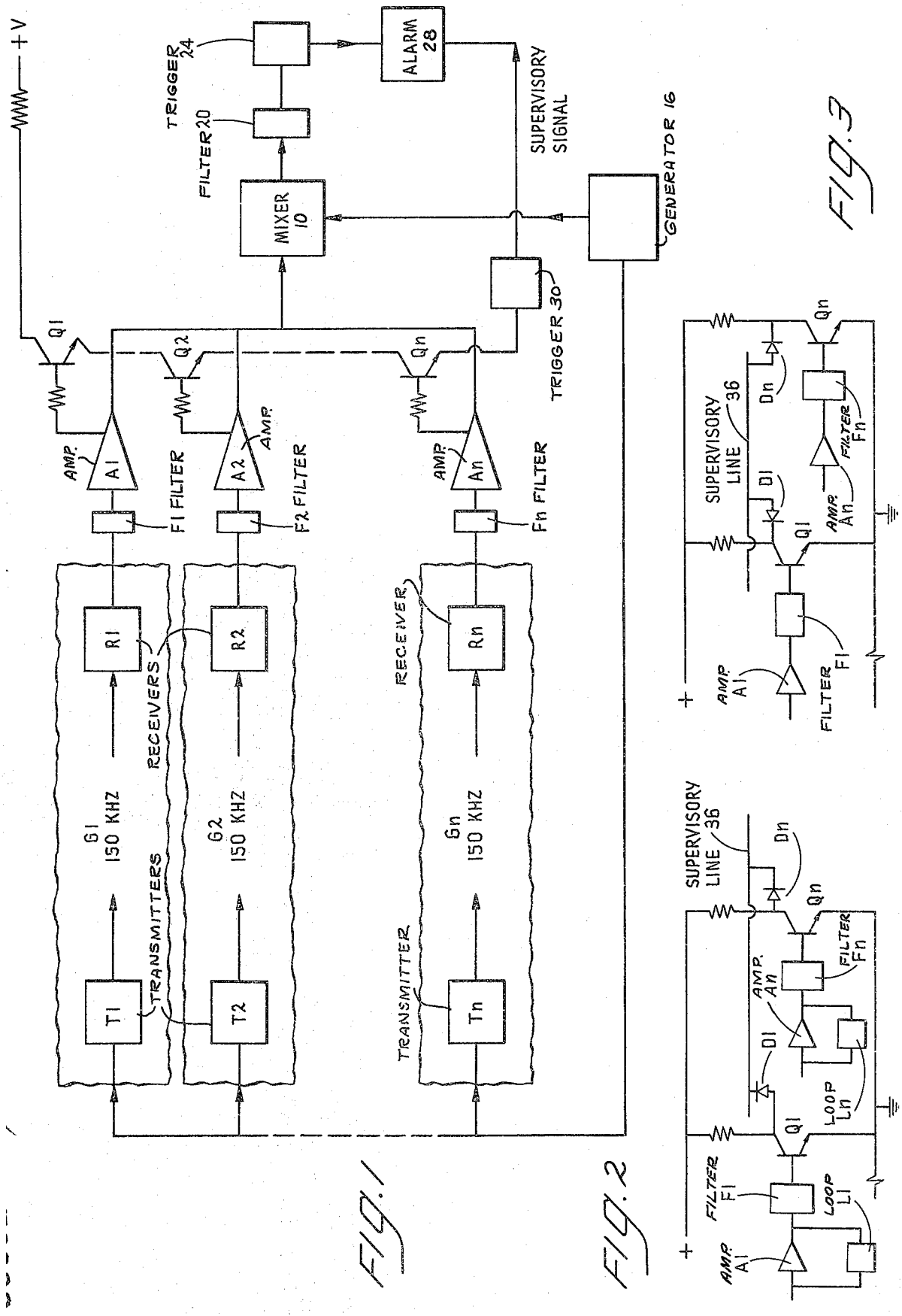

ACTIVE FREQUENCY-RESPONSIVE GLASS BREAKAGE DETECTOR

FIELD OF THE INVENTION

The present invention relates in general to a device or system for detecting breakage in a solid substance such as a glass panel. More particularly, the present invention is directed to an active system for detecting glass breakage and using a modulation-demodulation technique, or a filtering technique.

BACKGROUND OF THE INVENTION

There have been systems designed using various types of transducers for detecting glass breakage. In some stores or other establishments considerable amounts of money are spent in installing and maintaining these systems. One widely used system employs a foil loop transducer. This system requires periodic maintainence and the foil loop is too easily broken. The known prior art systems have one key drawback, and that is that they are passive. Typically, they employ a single transducer for detecting a predetermined frequency which is known to be generated when glass is broken. To reduce the likelihood of false alarms a gain control has been used in an attempt to discriminate between a hard knock, for example, and an actual breakage. However, because these systems are passive, accurate discrimination is not always possible. Also, with a passive system the signal to noise ratio is generally lower than with an active system.

Another problem associated with these passive systems is that, if a transducer is dislodged or malfunctions this is not detected. In essence, there is no supervision of the transducer.

Accordingly, one important object of the present invention is to provide an improved breakage detector preferably for detecting glass breakage. The system of this invention is in particular an active system.

Another important object of the present invention is to provide a breakage detector including transmitting and receiving transducers and means for supervising the proper operation of these transducers. Still another object of the present invention is to provide a glass break detector or system that is relatively inexpensive, easy to install, and can be maintained at relatively low cost.

SUMMARY OF THE INVENTION

To accomplish the foregoing and other objects of this invention there is provided a system for detecting breakage of a solid material such as a glass panel. The system generally comprises a transmitter transducer disposed at one area of the material for establishing a signal of a first frequency, a receiver transducer, means for mixing, and means for establishing an alarm condition. The material when broken or cut generates a signal of a second frequency. The receiver transducer is disposed at another area of the material for receiving a signal which may be a composite of the first and second frequency signals. The mixing means receives this composite signal and the first frequency signal and provides at least a third frequency signal which is the sum or difference frequency between the first and second frequencies. The alarm means is activated upon detection of this third frequency signal.

In the disclosed embodiment the first frequency signal is a 150K hertz signal, the second frequency signal is a 250K hertz signal and thus the difference frequency or third frequency signal is a 100K hertz signal, and the sum frequency is 400K hertz.

In a system application for covering a number of glass panels a plurality of transmitter and receiver transducers are used. A common mixer circuit may be associated with all of these transducers. Also, a common supervisory circuit may be associated with all of the tranducers.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is block diagram of a system of the present invention;

FIG. 2 shows one embodiment for a portion of the supervisory circuitry; and

FIG. 3 shows another embodiment for a portion of the supervisory circuitry.

DETAILED DESCRIPTION

The detector of the present invention is an active device or system for detecting the breakage of preferably a glass panel. This active system includes both a transmitting transducer and a receiving transducer. These transducers are typically attached to opposite sides of the glass panel for coupling a reference frequency to the glass panel. Alternatively, it has been found that the transducers may be disposed at the same location. This reference frequency may typically be a 150K Hertz signal. When a breakage occurs this reference frequency signal is modulated by a higher frequency signal generated by the glass breakage. This signal is then mixed with the reference frequency signal to provide a difference frequency signal which is present and detected only when a breakage occurs.

FIG. 1 shows the detector of the present invention used in a system for protecting a plurality of glass panels G1, G2, . . . G$n$. Associated with each of these glass panels is a transmitter transducer and a receiver transducer shown in FIG. 1 as transmitter transducers T1, T2, . . . T$n$, and receiver transducers R1, R2, . . . R$n$. Each of the transmitter transducers and their corresponding receiver transducers, such as the transmitter transducer T1, and the receiver transducer R1 are intimately coupled to the glass panel G1 so as to establish a permanent 150K Hertz signal in the panel which is received by the receiver transducer.

Each channel of the system corresponding to each glass panel also includes a high pass filter circuit coupled from each of the receiver transducers. In FIG. 1 there is shown the filters F1, F2, and F$n$ associated, respectively, with the receiver transducers R1, R2, and R$n$. These filter circuits reject signals of a frequency of, for example, 30K Hertz or lower. The output of each of these filter circuits couples in turn to amplifiers A1, A2, and A$n$. The output from these amplifiers couples to a mixer or demodulator circuit 10 which also receives the reference frequency signal from generator 16. If there are no broken or cut panels in the entire system then the both input frequencies to the mixer 10 are substantially the same and thus the output of the mixer is a DC level or a very low frequency signal. Under that condition this output which is coupled to filter 20 is not passed by the filter circuit as it is a high pass filter for passing signals in the vicinity of 100K Hertz, for example, or larger. The output of the filter 20 couples to a trigger circuit 24 and from there to alarm means 28. The trigger circuit 24 and associated alarm means is only activated upon breakage of a glass panel.

When a glass panel is broken or is cut sufficiently a signal is generated in the panel which may contain many frequency components. One frequency that has been found to be quite prevalent is a frequency on the order of 250K Hertz. If the glass is knocked but not broken a signal on this order of frequency is not generated. If, for example, glass panel G1 is broken then the output signal from amplifier A1 is a modulated signal which is composite of the 150K and 250K Hertz signals. When this signal is mixed with the reference frequency signal, mixer 10 has an output signal of approximately 100K Hertz. This signal is passed by filter circuit 20 and caused to trigger circuit 24 which in turn activates alarm means 28.

In FIG. 1 the individual components, shown therein are of conventional design. For example, the transmitter and receiver transducers are conventional devices and the filter circuits are also of conventional design. The trigger circuit 23 may be a Schmidt trigger circuit and the alarm means 28 may include an alarm relay and associated signaling device.

The amplifiers, although they may be of conventional design, are preferably provided with an automatic gain control loop, and preferably have a low impedance output. The gain control loop may be advantageous in certain systems, especially where large glass panels are used. Then, regardless of where the cut occurs the output of the amplifier is maintained constant in amplitude.

The mixer 10 may be designed in various forms and has been discussed as providing a difference frequency signal. The mixer may also provide both sum and difference frequency outputs. In that case the filter circuit would be tailored to select these sum and difference frequencies and would reject the reference frequency signal.

Another important feature of the present invention which is provided with an active system is the supervisory capability.

In FIG. 1 there is shown a series of transistors Q1, Q2 ... Qn which couple, respectively, from amplifiers A1, A2, ... An. These transistors connect in series with the emitter of one transistor coupling to the collector of the adjacent transistor. The collector of transistor Q1 couples to a DC power supply and the emitter of transistor Qn couples to alarm means 28 by way of a level detector or trigger 30. When all of the transducers are intact and there is a reference frequency signal received by all of the amplifiers then all of their corresponding transistors are maintained in conduction thereby holding the trigger circuit 30 in a non-alarm state. If one of either the transmitter transducers or the receive transducers is dislodged or malfunctions then the signal coupled from the corresponding amplifier will cut off the corresponding transistor such as transistor Q1 thereby opening the path through the other transistors also. When this occurs trigger circuit 30 is activated and alarm means 28 is in its alarm state.

The supervisory circuitry shown in FIG. 1 may be referred to as AND type circuitry. Alternatively, in FIGS. 2 and 3 there is shown supervisory circuitry that is of the OR type. In FIG. 2, for example, the amplifiers A1 and An have respectively associated therewith the automatic gain control loops L1 and Ln. Amplifiers A1 and An couple respectively to transistors Q1 and Qn. In this embodiment the transistors Q1 and Qn are essentially in parallel having their collectors coupled by way of a resistor to a positive voltage source and having their emitters coupled to ground, for example. In FIG. 2 there is a supervisory line 36 which couples to a trigger circuit. Diodes D1 and Dn couple from the collectors of transistors Q1 and Qn to this supervisory line 36. Under normal operating conditions with all of the transducers properly operating the transistors Q1 and Qn are maintained in conduction and the diodes D1 and Dn are reverse biased. If one of the transducers becomes dislodged then one of the transistors such as transistor Q1 ceases to conduct and its associated diode D1 does conduct causing a signal to be coupled on line 36 to the trigger circuit for generating an alarm condition.

The embodiment shown in FIG. 3 is quite similar to the one shown in FIG. 2 and like reference characters are used in FIG. 3 and FIG. 2. The one difference is that the diodes D1 and Dn are shown in a reverse polarity with respect to the polarity shown in FIG. 2. Thus, in the embodiment of FIG. 3 when the system is intact the transistors Q1 and Qn are not in conduction. However, if one of the transducers malfunctions or is dislodged the associated transistor conducts and the associated diode such as diode D1 conducts causing a signal on supervisory line 36.

The arrangements shown in FIGS. 2 and 3 are especially advantageous where there are a number of glass panels that are going to be monitored. In that condition, and using the supervisory arrangement shown in FIG. 1 there would be too large a total voltage drop across all of the transistors and thus there may be false triggering of the trigger circuit 30. Alternatively, with the arrangement shown in FIGS. 2 and 3 this problem does not exist as this is an OR type circuit.

In accordance with the present invention there could also be two receiver transducers associated with a single transmitter transducer. In installing the system and testing out the system it may be found that due to the size of the glass panel one receiver does not sufficiently pick up the signal from all areas of the glass. In that case, a second receiver transducer can be used.

The system of the present invention can also be constructed relatively inexpensively and is maintained quite inexpensively. If additional glass panels are added to the system this does not drastically increase the price of the system as some of the circuitry is commonly used, such as the mixer and alarm output circuitry shown in FIG. 1 Also, with the system of the present invention with a modulation technique it is possible to work at lower signal levels. Thus, the system can be used for larger areas of glass. Also, because a weaker signal can be extracted using the modulated waveform, there is a better signal to noise performance with this active system.

Hereinbefore, the reference frequency has been set forth as 150K hertz. This frequency can be lower in value such as 50K hertz in which case the sum and difference frequencies are 300K and 200K hertz rather than 400K and 100K hertz. Thus, when detecting both sum and difference frequencies, the 50K hertz reference frequencies is probably more advantageous as the filter has frequencies to discriminate that are closer in value.

Having described one embodiment of the present invention it should now become apparent to one skilled in the art that numerous other embodiments and modifications thereof are contemplated as falling within the scope of the present invention. The scope of this invention shall be interpreted by the following claims.

What is claimed is:

1. A system for detecting breakage of a solid material, said system comprising:
   a transmitter transducer disposed at one area of said material for establishing a signal of first frequency,
   said material creating a signal of second frequency when broken,
   a receiver transducer disposed at another area of said material for receiving a control signal which is said first frequency signal when no breakage occurs and a composite of the first and second frequency signals when breakage occurs,
   means for mixing said control signal with said first frequency signal to provide at least a third frequency signal when breakage occurs,
   and means for indicating an alarm condition upon detection of said third frequency signal.

2. The system of claim 1 wherein said second frequency signal is on the order of 250K Hertz.

3. The system of claim 2 wherein said first frequency is less than said second frequency.

4. The system of claim 1 wherein said third frequency is the difference between said first and second frequencies.

5. The system of claim 1 comprising amplifier means coupled from said receiver transducer to said mixing means.

6. The system of claim 5 comprising a plurality of transmitter-receiver pairs and like number of amplifier means.

7. The system of claim 6 wherein said mixing means includes a demodulator for providing a difference third frequency signal.

8. The system of claim 7 comprising a high pass filter coupled intermediate said demodulator and alarm means for rejecting frequency signals below said third frequency signal and passing said third frequency signal.

9. The system of claim 1 including means coupled from said receiver transducer for supervising the presence of said first frequency signal and coupling an alarm signal to said alarm means upon the absence of said first frequency signal.

10. The system of claim 9 including a plurality of transmitter transducers and a like plurality of receiver transducers.

11. The system of claim 10 wherein said supervising means monitors all said receiver transducers and an alarm condition is established upon the absence of a signal of first frequency from any one of said receiver transducers.

12. A system for detecting breakage of a solid material, said system comprising:
    a transmitter transducer disposed at one area of the material for establishing a signal of first frequency,
    said material creating a signal of second frequency when broken,
    a receiver transducer disposed at another area of the material for receiving a signal which is said first frequency signal when no breakage occurs and a composite of the first and second frequency signals when breakage occurs,
    means for detecting said control signal and generating an alarm signal upon detection of said second frequency signal when breakage occurs,
    and means coupled from said receiver transducer for supervising the presence of said first frequency signal.

13. The system of claim 12 wherein said means for supervising has an output coupled to said means for generating an alarm signal for generating an alarm signal upon the absence of said first frequency signal.

14. In a system having means for detecting breakage of a solid material including at least one transmitter transducer for establishing a first frequency signal and at least one receiver transducer, a supervisory system comprising means coupled from said receiver transducer for supervising the presence of said first frequency signal and means for generating an alarm signal upon the absence of said first frequency signal.

15. The system of claim 14 including a plurality of transmitter transducers and a plurality of receiver transducers.

16. The system of claim 15 wherein said means for supervising includes circuit means coupling from each receiver transducer for initiating an alarm signal upon the absence of a signal of first frequency from any one of said receiver transducers.

17. The system of claim 16 wherein said circuit means comprises a plurality of transistors and means for maintaining all the transistors in a like state when all the first frequency signals are being received.

18. A system for detecting breakage of a solid material comprising:
    a transmitter transducer associated with the material for establishing a signal of first frequency in the material, said material creating a signal of second frequency when broken,
    a receiver transducer for receiving a control signal which is said first frequency signal when no breakage occurs and a composite of said first and second frequency signals when breakage occurs,
    means for detecting said composite control signal to provide at least a third frequency signal, and means for indicating an alarm condition upon detection of said third frequency signal.

* * * * *